R. JOBLING.
EXPANSIBLE PIPE AND JOINT.
APPLICATION FILED JUNE 30, 1914.
1,197,496.
Patented Sept. 5, 1916.
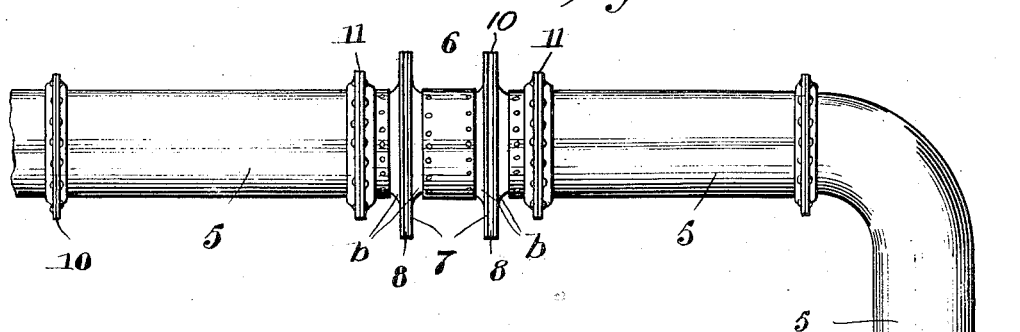
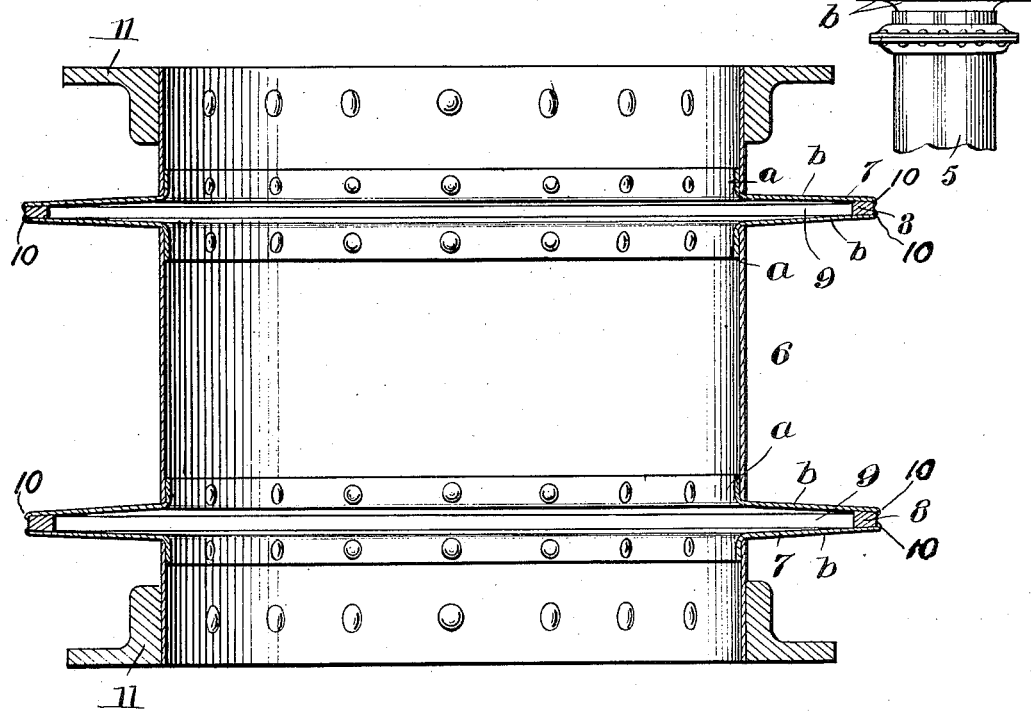
Witnesses
Frederick V. et.
F. O. ...
Inventor
Richard Jobling,
By Victor J. Evans
Attorney

UNITED STATES PATENT OFFICE.

RICHARD JOBLING, OF CALUMET, MICHIGAN.

EXPANSIBLE PIPE AND JOINT.

1,197,496.  Specification of Letters Patent.  Patented Sept. 5, 1916.

Application filed June 30, 1914. Serial No. 848,299.

*To all whom it may concern:*

Be it known that I, RICHARD JOBLING, a subject of the King of Great Britain, residing at Calumet, in the county of Houghton and State of Michigan, have invented new and useful Improvements in Expansible Pipes and Joints, of which the following is a specification.

The invention relates to pipe construction, and more particularly to the class of expansible pipes or joints therefor.

The primary object of the invention is the provision of a pipe or joint wherein the same can readily expand or contract by reason of variance of heat in the pipe line, the pipe or joint being of novel form and is of the required strength to withstand a predetermined pressure, and is also absolutely fluid-tight.

Another object of the invention is the provision of a pipe or joint of this character which is simple in construction, thoroughly reliable and efficient in its purpose, durable, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing: Figure 1 is a side elevation of a pipe line, showing the expansible pipe sections or joints constructed in accordance with the invention at intervals therein. Fig. 2 is an enlarged vertical longitudinal sectional view through the joint.

Similar reference characters indicate corresponding parts throughout the several views in the drawing.

Referring to the drawing in detail, 5 designates rigid pipe lengths, the bodies of which can be made of any diameter, length and thickness according to requirements, and are preferably constructed from standard steel plates riveted and usually rolled, each pipe length being formed from one plate to eliminate unnecessary riveting and friction, while 6 designates each expansible pipe section or joint hereinafter fully described.

The expansible pipe sections or joints comprise one or more pairs of opposed angle rings 7, the flange $a$ of each ring being telescoped within the end of an adjacent straight pipe 5, and is riveted thereto in any suitable manner, while disposed between the flanges $b$ of each of said pairs of rings is a spacer ring 8 which is welded to the flanges $b$ at the outer peripheries thereof to form an annular space 9 between the flanges $b$ of the said ring 7. Thus, it will be seen that these rings 7 and 8, when joined in the manner as hereinbefore described, serve as an expansible diaphragm similar to a bellows so that when expansion or contraction occurs in the pipe line the same will effect the pipe sections 6, taking up the expansion caused by the increase of heat in the said pipe line, and likewise the contraction due to a variance in the heat passing through the said pipe line. The inner surfaces of both the straight pipes 5 and the expansible pipe section 6 are galvanized, and likewise the outer surfaces thereof are galvanized.

The flanges $b$ are formed with inturned peripheral edges 10 which are adapted to overlap the outer peripheral edges of the spacer rings 8 which are welded to the angle rings 7 and to the said in-turned edges thereof. The pipe sections 6 at their ends adjacent to each other are connected together by means of angle iron rings 11 which are riveted thereto and also riveted together.

What is claimed is:—

In combination a plurality of pipe sections, a pair of annular members arranged to fit the inner circumferences of each pair of said pipe sections, a flaring integral flange formed upon each of said annular members, means for securing said annular members against displacement, and a spacer ring to which the flanges of each pair of said annular members are secured at their outer edges, the peripheral edges of each pair of pipe sections engaging the flaring flanges of a pair of said annular members.

In testimony whereof I affix my signature in presence of two witnesses.

RICHARD JOBLING.

Witnesses:
EDITH M. BENJAMIN,
JOHN D. KERR.